United States Patent

[11] 3,550,878

[72] Inventors James M. Crisp
Longmont;
Richard W. Van Pelt, Boulder, Colo.
[21] Appl. No. 765,871
[22] Filed Oct. 8, 1968
[45] Patented Dec. 29, 1970
[73] Assignee International Business Machines Corporation
Armonk, N.Y.
a corporation of New York

[54] DIGITAL POSITION DETECTION AND VELOCITY COMPENSATION SYSTEM
10 Claims, 6 Drawing Figs.

[52] U.S. Cl. .......... 242/184, 250/219
[51] Int. Cl. .......... G11b 15/06, G11b 15/58, G11b 23/12
[50] Field of Search .......... 242/184, 189, 75.51; 226/24, 42, 45; 250/219

[56] References Cited
UNITED STATES PATENTS

| | | | |
|---|---|---|---|
| 2,921,753 | 1/1960 | Lahti et al. | 242/184 |
| 3,135,447 | 6/1964 | Raymond | 226/42 |
| 3,318,545 | 5/1967 | Tobey | 226/24X |
| 3,319,901 | 5/1967 | Kurth | 242/186 |

*Primary Examiner*—Leonard D. Christian
*Attorney*—Hanifin and Jancin

ABSTRACT: A multiplicity of detectors are arrayed so as to define zones along the path followed by a web material in a buffer chamber. The detector outputs are logically interpreted to determine which zone the web material is in and the direction it entered that zone. The logical interpretation is used to generate commands for controlling the positioning and the speed of the material in the chamber.

INVENTORS
JAMES M. CRISP
RICHARD W. VAN PELT
BY Earl P. Hamel
ATTORNEY

DIGITAL POSITION DETECTION AND VELOCITY COMPENSATION SYSTEM

BACKGROUND OF THE INVENTION

1. Field of the Invention

This invention relates to apparatus for detecting the position of a web material in a buffer chamber and for detecting the direction of movement of the web material. More particularly, this invention relates to a system for detecting the position of magnetic tape in a vacuum column and the direction and displacement of that tape from a desired loop position. The invention is particularly adapted to providing command signals for control of reel motor drives as a function of the position and movement of the magnetic tape relative to buffer arms, vacuum chambers, or the like.

2. Description of the Prior Art

Magnetic tape drives have relied heavily upon the use of vacuum columns for providing a buffering loop of tape between the capstan drive and the storage and takeup reels. The inertia involved in accelerating and decelerating the capstan is considerably less than the inertia associated with the reel drives in providing these same functions since the reel drive must move and stop a larger mass. Thus, the vacuum chamber has developed as the intermediary buffering between the reel drives and the capstan. In effect, the vacuum column permits the reel drive to react slower to tape movement than the capstan, but allows it an opportunity to catch up with the tape movement relative to the capstan without producing undue tension in the tape.

As the tape drives have become more refined, capstan speeds have been significantly increased. As a result, it has become increasingly difficult to maintain correlation between capstan movement, reel movement and tape positioning in the vacuum columns.

To prevent overspeeding of the reel and excessive loop excursion in the vacuum column, particularly when worst case tape reversal conditions are encountered, the velocity of the tape loop as well as its position in the vacuum column must be sensed in order to control compensatory responses thereto. Various arrangements for effecting this have been suggested, such as by utilizing tachometers directly associated with the tape for controlling reel servo loop operations. However, the use of tachometers in direct association with the tape is undesirable since it creates additional drag on the tape and reduces the reaction time for the drive. Some prior art systems utilize detectors in the vacuum columns which determine the approximate position of the tape loop in the column and provide appropriate signals for maintaining the loop at relatively stable intermediary positions. For instance, U.S. Pat. No. 3,261,563, "Magnetic Tape Reel Control Servo System," by Aweida et al., shows such a system which employs a vacuum sensing arrangement including a multiplicity of sensing ports arrayed along the vacuum column. The Aweida et al. system maintains the loop position in the column at an above-center or below-center stable position during capstan motion and returns the tape to the centered position after the capstan is stopped. A somewhat similar system directed to tape rewind operations is shown in U.S. Pat. No. 3,199,800, "Tape Rewind Control," by 116

Other arrangements have been suggested using a multiplicity of vacuum ports for sensing tape position in a vacuum column, such as is shown in U.S. Pat. No. 3,307,795, "Tape Loop Control System," by Pendleton. This system detects the location of the tape in a particular zone defined by a given pair of vacuum sensing ports, and the reel drive controls brake or drive the reel motors as a function of the zone in which the loop is located. However, in systems such as that shown by Pendleton, the reaction to tape positioning in a given zone is fixed, and compensation is not actually initiated until the tape has moved a considerable distance in the vacuum column. Such systems have been found to be unsatisfactory for high speed tape drive operation, especially where the reel drive is operating at a high velocity to correct for the tape loop being present in one zone at the time of a capstan reversal. This has resulted in the tape actually being pulled completely out of the vacuum column, or, conversely, excessive amounts of tape being forced into the vacuum column before the reel command system has had time to counterreact.

SUMMARY OF THE INVENTION

The present invention is a system for not only detecting the zone in which a web material is located in a vacuum column or the like, but also detecting the direction in which the web material entered that zone. The location and direction information so detected can then be used to determine the most appropriate action which should be taken by the reel motor control. Thus, in a zone immediately adjacent to the desired loop position for a magnetic tape in a vacuum column, the fact that the tape was moving towards the desired loop position should be reacted to by removing power from the reel drive, whereas the fact that the tape was moving away from the desired loop position when it entered this zone can be reacted to by actuating the reel drive so as to return the tape towards the desired position. Therefore, one aspect of the present invention is to sense the presence of the tape in a zone and the direction from which it entered that zone, which is particularly useful for determining the appropriate motor control commands.

The basic zone position and direction detection circuitry mentioned hereinbefore can be interconnected for sensing relative to a plurality of such zones either on one side of the desired loop position or on both sides thereof. Accordingly, the presence of the tape loop in a zone which is located most remote from the desired loop position can provide a command signal to cause the loop to begin moving towards that desired loop position, while the additional zone detectors can sense the entry of the loop from the extreme position to cause the reel drive to begin to coast and/or brake the tape movement. Logic circuitry associated with the position and direction detecting apparatus can be coordinated with commands to the capstan for modifying the reel motor commands in accordance therewith.

It is an object of the invention to provide a system for detecting the approximate position of a web material in a buffer chamber and the direction in which that material approached such position.

Another object of the present invention is to detect the approximate position and direction of movement of a web material in a buffer chamber and to logically provide compensating command signals based upon that information.

Yet another object of the present invention is to detect the position and movement of a tape loop in a vacuum chamber and to continuously compensate for such movement with minimum oscillation and overshoot.

The foregoing and other objects, features and advantages of the invention will be apparent from the following more particular description of the preferred embodiments of the invention as are illustrated in the accompanying drawings.

BRIEF DESCRIPTION OF THE DRAWINGS

FIG. 1 shows a single vacuum column 10 with six-digital position sensors numbered 1 through 6 arrayed along the path of the tape loop in that column. The tape 12 is introduced or removed from reel 11 relative to column 10 and is additionally moved by a capstan, not shown, which responds to a forward command (FWD) to introduce tape into column 10, as indicated by the arrow, and, conversely, responds to a reverse direction command (BKWD) to remove tape from the right side of column 10, as indicated by the lower arrow. Detectors 1—6 can be of any variety as are well known in the art, such as simple vacuum switches, photocells or the like. For instance, vacuum controlled capacitor sensors are shown in U.S. Pat. No. 3,261,563, by Aweida et al., while photocell detectors are shown in U.S. Pat. No. 3,250,480, 3,250,480, "Tape Handling Apparatus," by Jacoby. It is desired to maintain the loop between ports 2 and 5 when the capstan is stopped. The fact that a given detector, such as detector 3, is at atmospheric pressure while detector 4 is under a vacuum, means that the tape is located between these two detectors. The Reel Motor Order listing to the right of column 10 will be described in greater detail hereinafter with respect to FIG. 3. Each pair of detectors 1—6 defines a zone indicated as "A" through "G" therebetween.

FIG. 2 illustrates in NOR logic the novel circuitry in accordance with the present invention for sensing not only the zone location of the tape in column 10 but also the direction in which the tape entered that column. For purposes of illustration, it will be assumed that the circuitry shown in FIG. 2 is provided for detecting tape movement and positioning relative to zone E as defined by detectors 4 and 5. The FIG. 2 circuitry essentially remembers whether the tape entered the zone from above or below and produces an output signal indicative thereof whenever the tape loop is actually between detectors 4 and 5. Logic circuitry of FIG. 2 can be duplicated to give the same information in any zone of interest, and resolution can be increased by the addition of similar sensor circuits.

Figure 2:
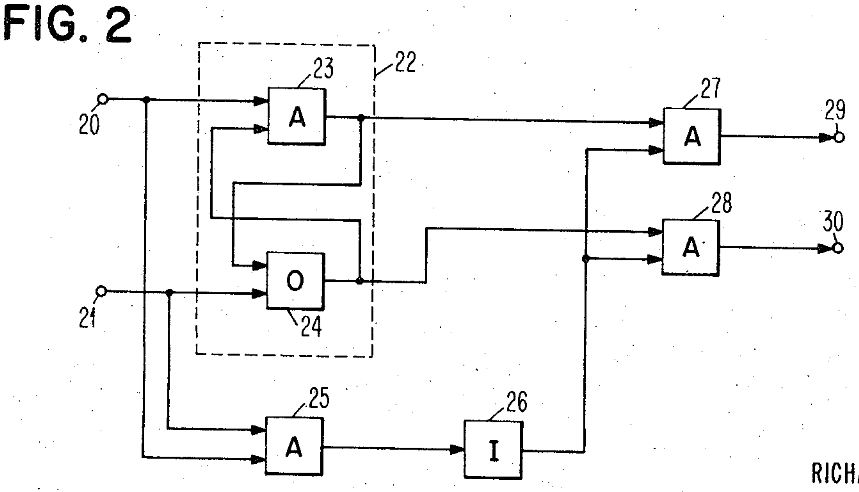
FIG. 2 illustrates a typical zone position and direction sensing circuit in accordance with the present invention.

In the circuitry shown for FIG. 2, each of the AND and OR circuits essentially react to conditioning inputs to produce outputs in a similar manner. That is, two positive levels into either circuit will produce a negative output level, whereas two negative input levels or any combination of positive and negative input levels will produce a positive output. The input to terminal 20 will be positive as long as the loop is below detector 4 in column 10 but will be at a negative level whenever the tape loop is above detector 4. Detector 5 will provide a positive input to terminal 21 as long as the loop is above detector 5 in the vacuum column but will provide a negative level whenever the loop is below detector 5. Latch 22 is connected to be set by the signal at terminal 20 and to be reset by the input at terminal 21.

Assume that the loop is initially in the zone D or center position. Since the loop is above 4, a negative level had been introduced to AND 23, thus producing a positive level output therefrom as one input for OR 24. Since 21 is at a positive level, OR 24 will be providing a negative output for conditioning AND 23. Thus, the movement of the loop downward from zone D and past detector 4 will cause the appearance of a positive level at 20 but will not change the positive output from 23 thereby holding the negative output from 24 in that condition.

In addition, the appearance of a positive level at 20, in conjunction with the positive level at 21 will result in the conditioning of AND 25. The negative output from AND 25 is inverted to a positive level in invert 26 to condition AND circuits 27 and 28. Since AND 23 is producing a positive output while OR 24 is producing a negative output, AND 28 is deconditioned, but AND 27 would then be completely conditioned, and an output signal would be produced at terminal 29. This signal indicates that the tape loop is now located in zone E defined by detectors 4 and 5 and that it entered zone E from above. Appropriate corrective action can then be taken such as will be described in greater detail hereinafter with respect to FIG. 3.

After the loop has passed below detector 5, the level at 21 will change state from positive to negative thereby deconditioning AND 25 and removing the output from terminal 29. In addition, OR 24 will sense the presence of a negative level at 21 which will change the output level thereof from negative to positive. As a result, two positive inputs will be provided to AND 23 so that the output, therefore, will become negative. Accordingly, when the loop begins to rise and passes detector 5, the appearance of a positive level at 21 will not change the positive level output of OR 24 nor the negative level out of AND 23 but will result in AND 25 being once again completely conditioned. Via inverter 26, AND 28 will now be completely conditioned, and an output signal will be produced at terminal 30. This signal indicates that the loop is once again in zone E but has now entered zone E from below.

Thus, the output of AND 25 indicates the presence of the loop in zone E, and the output at terminals 29 or 30, as controlled by latch 22, will indicate that the loop entered that zone while rising or falling in the vacuum column.

Referring again to FIG. 1, the reel motor orders associated with the movement of the capstan are indicated in the chart. More specifically, the capstan controls will respond to a backward motion command (BKWD) by energizing the capstan so as to withdraw tape from column 10. This correlates with the UP column in the reel motor order chart which means that the tape loop is moving up in column 10. Thus, as the tape loop passes detector 3 and enters zone C, the logic circuitry, such as is shown in FIG. 2, will detect this condition and can produce an output signal that will cause the reel motor drive connected to reel 11 to drive tape 12 downward into the column 10. This is indicated by the downward pointing arrow associated with zone C in the UP column. Assuming that the reel motor is not able to react fast enough to drive the tape back into zone D before it is pulled into zone B by the capstan, the logic circuitry associated with zone B will also cause a downward driving command to be connected to the reel drive motor as is indicated by the downward pointing arrow associated with zone B in the UP column. This same circumstance will continue if the tape is pulled into zone A. As will be more fully appreciated from the description associated with FIG. 3, zone C and zone E logic circuitry may be arranged so that it does not react to the presence of the loop in these zones by providing an upward or downward reel motor order, respectively, except under special circumstances.

Eventually, the reel motor commands will cause sufficient tape to be introduced to column 10 so as to compensate for tape movement from the capstan. As a result, the tape loop will leave zone A and enter zone B. The FIG. 2 logic circuitry for zone B will produce an output that will cause a coast command to the reel motor drive as is indicated by the dash (-) sign associated with zone B in the UP column. A similar reaction will be provided by zone C when the loop enters therein from zone B. When the tape loop enters zone D from zone C, dynamic braking will be instituted. Dynamic braking could typically be accomplished by shorting the armature for the reel motor so that it acts like a generator and produces braking torque.

Returning briefly to FIG. 2, it should be noted that, if similar logic is to be employed for detecting and providing output signals for zone F between detectors 5 and 6, the input introduced to the upper terminal of the zone F logic would be essentially the same signals as introduced to terminal 21, except that they would be inverted. That is, the upper signal introduced to the zone F logic circuitry would be negative as long as the loop was above detector 5 and would be positive when the loop was below detector 5, which is the exact inverse of the levels shown and illustrated for FIG. 2.

Figure 1:
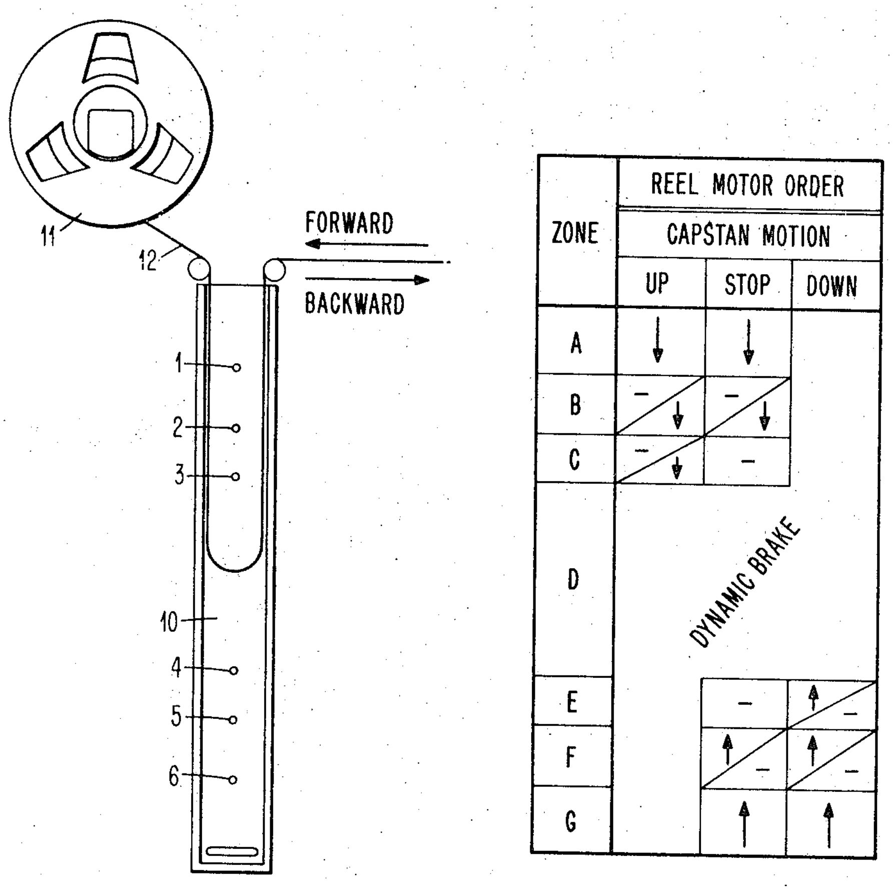
FIG. 1 is an illustration of a typical vacuum column with appropriate reel motor orders charted in association therewith.
Figure 3:
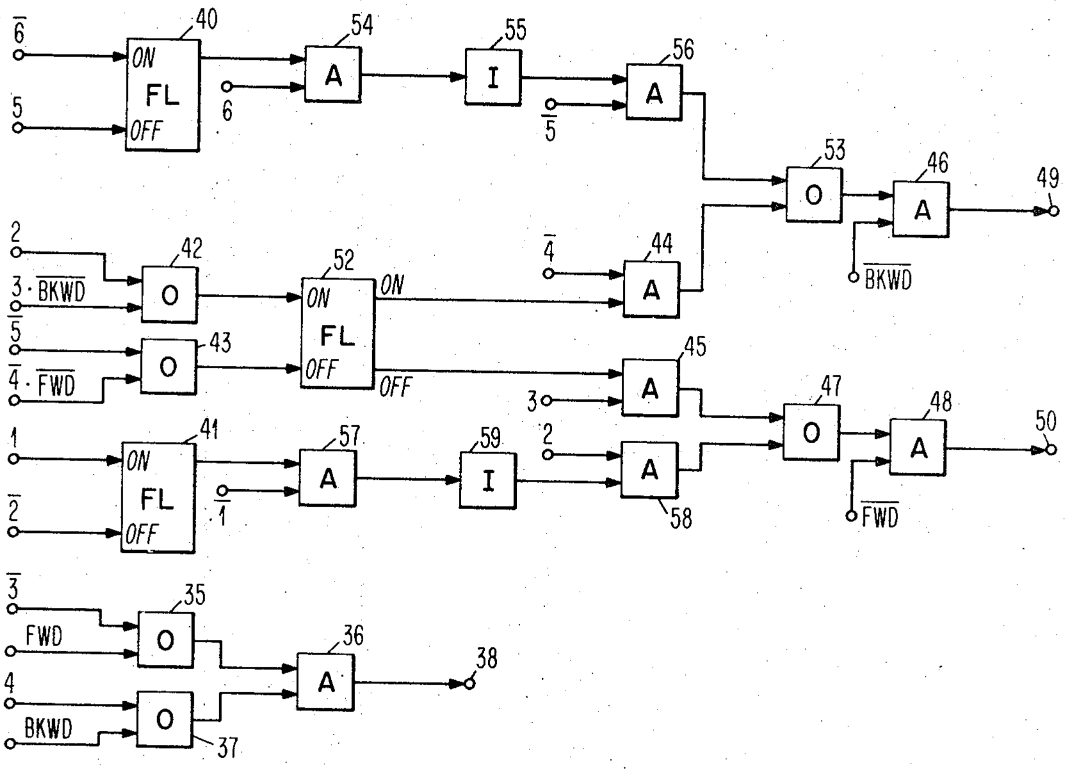
FIG. 3 is a positive logical block diagram of a complete system employing the present invention for controlling loop position in a vacuum column.

FIG. 3 shows logic for effecting the operations shown in the table associated with vacuum column 10 in FIGS. 1. The FIG. 3 circuit operates with the six-vacuum port sensors or detectors 1—6 and is shown in positive logic in contrast to the NOR logic of FIG. 2. That is, in the logic circuitry of FIG. 3, an AND circuit will produce a negative output unless all inputs are positive, in which case a positive output will be produced. Similarly, an OR circuit will produce a positive output as long as any input is positive but will produce a negative output only in response to all negative input conditions. Further, the inputs indicated with the NOT condition (i.e., $\overline{6}$) means that this line is positive when the tape loop is below the detector associated with that number placing it at atmospheric pressure, and is negative when the tape loop is above the detector associated with that number or that is under a vacuum. All inputs designated by a number without a bar (i.e., 6) indicate that a positive level is produced in that line as long as the tape loop is above the associated sensor and will produce a negative input whenever the tape loop is below such detector. Thus, when the tape loop is above detector 6, the 6 input is positive, whereas when the tape is below the 6 detector, the $\overline{6}$ line is positive. $\overline{FWD}$ and $\overline{BKWD}$ are positive only when the forward and backward commands, respectively, are not present.

Assume initially that the tape loop is in zone D and there is no motion of the tape resulting from capstan movement. Lines $\overline{3}$ and 4 will be positive, thus conditioning AND 36 to provide an output at terminal 38 which commands the reel drive motor controls to provide dynamic braking thereby holding the loop in the approximate desired position in zone D. Under these conditions, the 5 and $\overline{2}$ lines will be up, thereby placing latches 40 and 41 in the off state. It will be assumed initially that latch 52 is also in the off state. When a FWD command is introduced to the capstan, the capstan will begin introducing tape into the vacuum column and, when the loop passes detector 4, the $\overline{4}$ input will be provided to AND 44 which is still deconditioned since latch 52 is off. The tape loop will continue descending in the column until it passes detector 5, where the transition of $\overline{5}$ to a positive level will provide one conditioning input to AND 56. Since latch 40 was initially off, AND 54 will be deconditioned which, through invert circuit 55, will effect completion of the conditioning for AND 56. Therefore, an output will be generated through OR 53 into AND 46 which will also be conditioned since the presence of a FWD command indicates that $\overline{BKWD}$ is also present. Therefore, a signal will be produced at terminal 49 which will direct the tape reel drive to commence moving the tape reel in a direction for removing tape from the column. This is indicated in the chart associated with FIG. 1 by the upward pointing arrow for the zone F block under the DOWN capstan motion, bearing in mind that a FWD command results in capstan motion in such a direction as to drive tape downward into the vacuum column 10.

In the event that the reel drive does not react fast enough to prevent the tape loop from descending past detector 6, latch 40 will be set by the $\overline{6}$ input going positive which will partially condition AND 54 although AND 54 will then become deconditioned before it could produce a positive output in view of the transition of the 6 input to a negative level. As a result, AND 56 will continue to be conditioned, thus maintaining the command at terminal 49 for causing the reel to remove tape from the column. Ultimately, the tape loop will begin upward movement and pass detector 6 thereby completing the conditioning of AND 54 so that AND 56 will be deconditioned and the signal at 49 will drop. This causes the tape reel motor to enter the coast phase shown as a dash (-) in association with zone F in FIG. 1.

If the tape loop continues upward motion past detector 5, latch 40 will be turned off thus effecting the conditioning of AND 56, although the transition of the $\overline{5}$ input to a negative level will cause the output of AND 56 to drop so that the reel motor drive will continue in a coast mode. It should be noted also that the rise of the $\overline{5}$ input to OR 43 will have reset latch 52, thus deconditioning AND 44 so that the tape loop can only enter a coast mode in zone E. Conversely, if the tape should return to zone F from zone E or zone G from zone F, the positive level at $\overline{4}$ or $\overline{5}$, respectively, will cause a reel control signal at 49 for again driving the reel motor for removing tape from the column. When the tape loop enters zone D, OR circuits 35 and 37 will again be conditioned and dynamic braking will be commanded by a signal appearing at 38.

A BKWD command for the capstan would cause the tape loop to begin upward movement correlations to the UP column of the CAPSTAN MOTION chart in FIG. 1. When the loop passes detector 3, AND 45 will be completely conditioned since latch 52 had been previously reset (off) and will cause a signal through OR 47 thus providing one input for AND 48. Since the BKWD command is present, the $\overline{FWD}$ line will be up, thereby providing an output from AND 48 at terminal 50 to direct the reel drive control to introduce tape into the column. Assuming that the reel drive circuitry does not react sufficiently to prevent the loop from passing detector 2, the 2 input for AND 58 will be present. Since latch 41 is off, AND 57 will not be conditioned so that AND 58 will be conditioned by means of invert 59. Thus, AND 58 will provide a continuing drive command at terminal 40, even though the appearance of a 2 input to OR 42 will turn latch 52 on so as to decondition AND 45.

If the tape loop rises above detector 1, latch 41 will be set, but AND 57 will be deconditioned by the loss of a positive level at $\overline{1}$. Thus, the drive command will still continue to be present at terminal 50 causing the reel motor to continue to attempt to drive tape into the column. However, when the tape loop descends below detector 1, latch 41 will remain on thereby completing the conditioning of AND 57 which further results in deconditioning of AND 58 thus removing the command signal from terminal 50. Thus, as the loop entered zone B or zone C, a coast mode would continue since AND 45 and AND 58 would both be deconditioned. When the loop passed into zone D, an output would be produced by both OR 35 and OR 37 generating the dynamic braking command at terminal 38.

The use of the $\overline{FWD}$ input to AND 48 and the $\overline{BKWD}$ input to AND 46 is intended to reduce the possibility of overspeeding during capstan turnaround transitions as well as to provide a safety measure. That is, since the signal at terminal 49 will cause tape to be removed from the column by the reel drive, the presence of a BKWD command such as would occur with a capstan reversal would cause the capstan to likewise remove tape from the column and, thus, it is desirable that both operations not be performed concurrently. The disclosed circuitry effects this result. It should be further noted that an inverted output from 38 could be coupled as an additional conditioning input to AND circuits 46 and 48 to further ensure that no output is produced at 49 or 50 when 38 is producing a dynamic braking order.

The combined inputs of 3 and $\overline{BKWD}$ for OR 42 is for the purpose of conditioning latch 52 so that the movement of the tape from zone C through zone D into zone E will be responded to by a signal at 49 to immediately initiate removal of tape from the column by the reel. Thus, positive levels at 3 and $\overline{BKWD}$ means that tape is above 3 but is not being withdrawn from the column by the capstan. The ANDing of 3 and $\overline{BKWD}$ ensures that zone E will respond to an excursion of the tape into that zone all the way from zone C which could only have resulted from a reversal of capstan command while the tape loop was in the upper portion of the column. Conversely, the ANDing of $\overline{4}$ and $\overline{FWD}$ to provide an input for OR 43 will reset latch 52 in anticipation of loop movement from zone E to zone C in response to a capstan reversal while the tape loop is in the lower portion of the column.

If for any reason the loop should happen to be in zones E, F or G when an UP or backward capstan motion is initiated (i.e., so as to remove tape from column 10), the capstan motion will actually be moving the tape loop towards zone D. Therefore, as the UP column in the FIG. 1 chart shows, the reel motor orders continue with dynamic braking for all of these zones, and no drive commands are coupled to the reel motors until the tape has moved all the way to zone C. In FIG. 3, this means that the BKWD and $\overline{3}$ inputs are conditioning AND 36 to provide a signal at 38. Similar functions are employed for capstan motion in the downward direction in response to forward commands to the capstan. That is, the reactions of zones C, B and A directly correlate with the reactions of zones E E, F and G, respectively, whenever the tape is driven downward into column 10. Dynamic braking is effected for downward capstan motion when the loop is in zones A, B and C, since the capstan at that time would be providing tape motion in the proper direction for moving the loop towards zone D. The FIG. 3 circuitry under these circumstances will have positive FWD and 4 input levels for producing a dynamic brake command signal at 38.

In response to a stop command to the capstan, reactions are symmetrical on either side of zone D as can be seen from the STOP column of FIG. 1. These reactions are substantially the same as the zones A, B and C reactions for up commands as well as the zones E, F and G reactions to the down commands. The net effect is to move the tape loop towards zone D employing driving power or coasting, depending upon the zone entered and the direction of last movement.

From the preceding description, it should be appreciated that the logic circuitry described hereinabove for FIG. 3 causes the logic associated with zones C and E to generate drive down or drive up commands to the reel motor control only when the tape loop has last been on the opposite side of zone D. That is, the zone E logic will provide an output command at terminal 49 in response to the presence of the loop in zone E only when the tape loop last entered zone D from zone C. More specifically, latch 52 would not have been set unless the tape loop had been above detector 3 with the absence of a BKWD capstan command or had been above detector 2. The result is no command will appear at terminal 49 for the purpose of removing tape from the column if the loop had gone from zone E into zone D and then back into zone E. Thus, the aforementioned sequence of loop movement from E to D back to E will cause a coast mode to be entered, and no upward reel motor order will actually be generated until the tape goes below detector 5.

To illustrate the reason for the foregoing, consider a condition wherein the tape is in the zones A, B or C when a capstan reversal command is generated. The tape loop will begin rapid acceleration towards the bottom of the column. By the arrangement shown, zone E can quickly react to this circumstance to provide an early tape reel command for commencement of removal of tape from the column. However, whenever the tape has left zone E into zone D and then returned to zone E, the reel drive system can be designed to respond with sufficient rapidity to overcome the capstan speed, despite the fact that no reaction is initiated until the tape loop has entered zone F. By this arrangement, several advantages are realized. First, the system can be designed for relatively stable operation between zones F and E or zones B and C, which are basically a drive-coast-drive-coast cyclic sequence. This is desirable since the coasting mode does not waste power as would be the case with mechanical and/or dynamic braking, and only sufficient power to maintain the loop in the column in reasonable proximity to the desired location is utilized. Even if the system is designed for stable continuous operation between zones F, E and D or B, C and D in a drive-coast-brake-coast-drive cyclic sequence, the coast modes reduce the amount of power lost in dynamic braking and further permit time for the motor controls to settle down between drive/dynamic brake transitions. A second advantage is that this arrangement diminishes the number of times that the motor controls must be turned off and on for handling rapid drive to dynamic braking current reversals. Thus, if the system cycled about detectors 3 and 4 in and out of zone D, forward power and dynamic braking would be required for a significantly greater number of times than if the system is permitted to cycle about detectors 2 and 5. Yet a third advantage of this system is that the amount of strain on the tape reel is significantly reduced since it is not nearly as often that direct drive to dynamic braking and vice versa is effected.

In the event that it should be desired to cause immediate reaction to the entry of the tape loop into zone E, D and C, obvious modifications of the present invention can be made. For instance, the 4 and FWD inputs can be ANDed to provide one additional input to OR 42, while the $\overline{3}$ and BKWD commands can be ANDed to provide an additional input to OR 43. This would effect the setting of latch 52 so that each section of the system would be prepared to react to the presence of the tape loop in the first zone encountered relative thereto.

Figure 4:
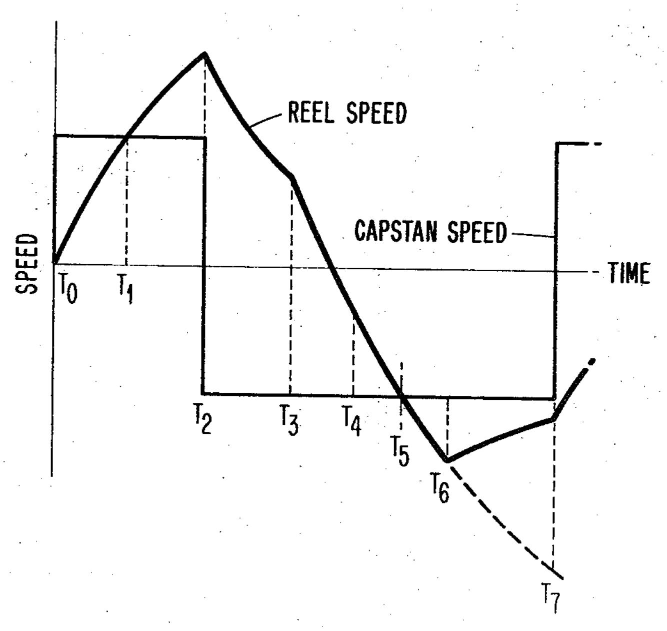
FIG. 4 is a time base diagram of capstan and reel motor reactions under worst case conditions.
Figure 5:
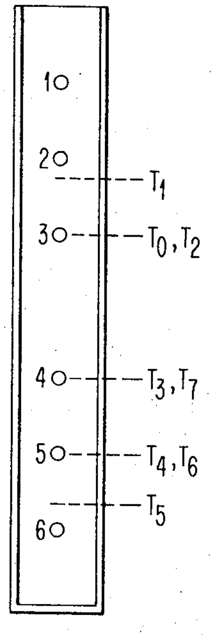
FIG. 5 shows the tape loop position in a vacuum chamber in correlation with FIG. 4.

FIG. 4 is a time-base diagram of the reaction of the present circuitry as compared with certain worst-case conditions. It is assumed that the tape is initially in the central zone of the vacuum column (see FIG. 5), and that the capstan is given a BKWD command thereby removing tape from the column. The tape will begin moving upward and will pass detector 3 at time TO. The reel drive circuit will be assumed to have received a command at that time to begin introducing tape into the vacuum column. The reel speed will increase until it equals the capstan speed at time T1, which is assumed to be shortly before the loop has reached detector 2 as is shown in FIG. 5, for time T1. The reel speed then continues past the capstan speed and begins to move the tape loop downwards and just passes detector 3 at time T2 when the capstan direction is reversed by removal of the BKWD command and application of the FWD command so that the capstan and the reel are now both introducing tape into the vacuum column. From time T2 to time T3, dynamic braking will be effected since FWD and 4 are both positive. At time T3, detector 4 will be passed by the loop, and a reverse command to the reel drive will be introduced since the loop had originally entered zone C immediately prior to passing through zone D into zone E.

From time T3 until the time that the reel drive speed approaches zero, plugging is effected in that reverse drive power is being applied to the reel drive motor even though the motor is actually rotating in the opposite direction. Ultimately, at time T4, detector 5 will be passed by the loop, and the system will be effectively conditioned to rapidly react to a reversal of capstan rotation. The reel speed and capstan speed will again be equal at time T5 momentarily stopping loop movement, and the reel will continue to increase speed until time T6. At time T6, the loop will have passed detector 5 in an upward direction, and, therefore, a zone E coasting mode will be entered so that the reel drive speed will begin to decrease slightly because of friction and the fact that the reel drive is effectively pulling tape upwards against the vacuum. At time T7, the loop passes detector 4 and dynamic braking is effected. When detector 4 is passed in the downward direction, the reel drive would again begin coasting and, thus, the loop will oscillate between zones D, E and F.

In prior art systems, the reel drive speed would continue to increase in accordance with the dashed curve between T6 and T7. However, the removal of the FWD command and the application of the BKWD command to the capstan at T7 will cause capstan rotation reversal. In the prior art system (dashed line) the reel drive and the capstan are both now driving tape into the column with an excessive speed thereby hazarding the possibility of the tape loop pulling out of or dropping to the bottom of the column. In systems using the present invention, the reel drive speed would never be greater than is shown at time T6 (or T2 for opposite rotation) and would be considerably less than is shown dotted at T7. Furthermore, loss of power from dynamic braking would be diminished.

Figure 6:
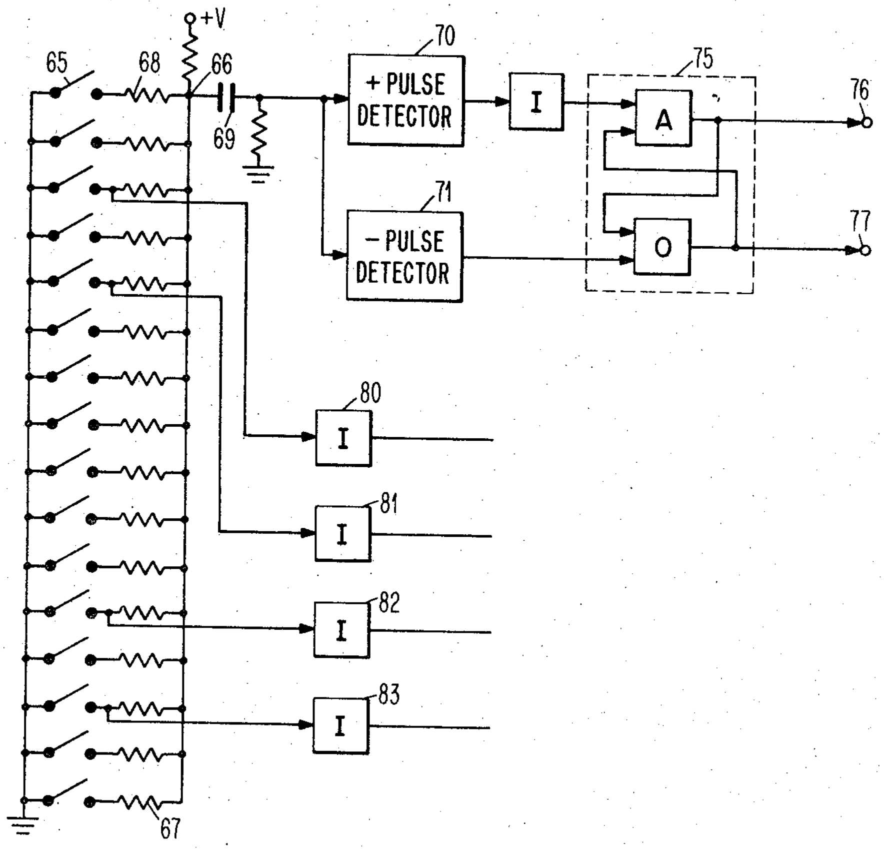
FIG. 6 depicts the manner in which analog and digital signals can be concurrently developed by vacuum column sensors. DESCRIPTION OF THE PREFERRED EMBODIMENTS By way of example.

The FIG. 6 circuitry shows an arrangement for providing high resolution position and direction sensing. Switches such as 65 associated with a plurality of vacuum ports are closed whenever the tape loop is above the port associated with that switch. In FIG. 6, the position of the tape is represented by the analogue voltage appearing at node 66. The values of the resistors associated with the vacuum switches, such as resistor 68, are chosen such that the digital position signals can be picked off from as many switches as might be desired. Each sensing point is at ground when its switch is closed so that the position of the tape loop can be directly converted to digital logical levels.

Node 66 is capacitively coupled to pulse detectors 70 and 71. Pulse detector 70 is arranged so as to provide an output in response to a positive transition coupled thereto, whereas pulse detector 71 provides an output in response to a negative transition. The RC coupling network is designed to provide a pulse wide enough to set or reset latch 75 but narrow enough to allow recovery before the next switch transfer occurs. The RC network could also be tailored to eliminate the effect of switch contact bounce if it should occur. Latch 75 is connected to the pulse detectors in such a way as to remember whether the last switch transient was an opening or closing and, hence, whether the loop is moving up or down which would be indicated by a level at terminal 76 or 77, respectively. The limit to the number of switches that can be used per latch is the sensitivity and repetition rate limit of the pulse detectors, although 64 switches could typically be utilized per column without difficulty. The switch resistor values can be chosen to give equal voltage increments at node 66. Since the pulse detector is required to sense only polarity, it can be designed to allow the resistors to vary widely from the values which could be, for 16 resistors, incremented from 1,925 ohms for resistor 68 to 350 ohms for resistor 67. The outputs of invert circuits 80—83 can be used to provide digital position information. Accordingly, the outputs of inverters 80—83 identify the zone in which the loop is located while the output of latch 75 indicates the direction of loop travel.

The circuitry shown in FIG. 6 is particularly advantageous in that the choice of the network permits high resolution digital position data and direction of motion detection with a minimum of circuitry and adjustments. If it were desired to sense amplitude of velocity, the FIG. 6 circuitry could be extended to include a frequency-to-DC converter sensing the rate of pulses coming from either pulse detector 70 or 71. The converter could be analogue or digital.

Although the invention has been particularly shown and described relative to the foregoing embodiments, it will be understood by those having normal skill in the art that various changes and modifications can be made without departing from the spirit of the present invention. For example, a technique similar to the drive order inhibition as a function of direction of loop motion as described hereinbefore for zones C and E could be used to provide another speed control refinement. This could be effected by adding another pair of sensors between 3 and 4 and making braking also a function of direction of motion. 26

We claim:

1. Apparatus for indicating the location and direction of movement of an object along a path comprising:
- a plurality of detector means located in spaced relation along said path and providing respective output signals, each of said detector means being constructed and arranged for changing the state of said output thereof in response to passage of said object in proximity thereto;
- logic means coupled for responding to the change of state of at least one of said detector outputs for providing an output signal indicative of the direction in which the object is moving along said path;
- means coupled for interpreting the outputs of said plurality of detector means for indicating the location of said object relative to said plurality of detector means; and
- whereby the indications produced by said logic means and said interpreting means will denote both the location and the direction of movement of said object along the said path.

2. Apparatus in accordance with claim 1, wherein said plurality of detector means includes:
- at least a first and second detector means;
- said logic means including means responsive to the outputs of said first and second detector means for providing an output signal indicative of which of said detector means last changed the state of its said output; and
- wherein said interpreting means includes gating means conditioned by the outputs of said first and second detectors whenever said object is located between said detectors, said gating means being coupled to receive said logic means output signal for producing an indication of the state thereof in response to the presence of said conditioning from said first and second detectors.

3. Apparatus in accordance with claim 2, wherein said gating means includes:
- a first AND circuit coupled to be conditioned by the outputs of said first and second detector means whenever said object is located along the path between said first and second detector means; and
- which further includes second AND circuit means coupled to the output of said logic means and conditioned by the output of said first AND circuit for providing the direction and location indicating output signals.

4. A system for controlling the positioning and movement of a web material relative to a desired loop position with respect to a buffer device, comprising:
- driving means for selectably braking, introducing and removing the web material relative to the buffer device;
- a plurality of detectors spaced along the path of travel of the web relative to the buffer device, each of said detectors providing a first output when the web is between the desired loop position and the said detector, while providing a second output when the said detector is between the web and the desired loop position;
- first logic means coupled to respond to the said second output of the said detector most remote from the desired loop position for causing said driving means to move the web towards the desired loop position; and
- second logic circuit means coupled to the outputs of at least one pair of said detectors for reacting to a change of state from said first output to said second output for the said detector of said pair nearest the desired loop position for introducing a signal to cause said driving means to move the web loop towards the desired loop position, said second logic means reacting to a change of state from said second output to said first output of the said detector of said pair furthest from said desired loop position for deactivating said first logic means so as to remove the output thereof to said driving means.

5. Apparatus in accordance with claim 4, wherein:
- said plurality of detectors are arranged on either side of the desired loop position;
- which further includes a pair of said first logic means each coupled to respond to the respective outputs of the most remote said detectors relative to the desired loop position;
- which further includes a pair of said second logic circuit means for reacting to the outputs of respective pairs of said detectors, said pairs of detectors being arranged on opposite sides of the desired loop position; and
- one of said first and second logic circuit means being arranged for causing said driving means to introduce web material relative to said buffer device for causing said web material to approach the desired loop position from one direction, whereas the other of said first and second logic means being arranged for causing said driving means to remove web material relative to said buffer device for causing the web material to approach the desired loop position from the other direction.

6. Apparatus in accordance with claim 4, wherein:
- said plurality of detectors are arranged on either side of the desired loop position;
- which further includes a pair of said first logic means, each coupled to respond to the respective outputs of the most remote said detectors relative to the desired loop position;
- which further includes first and second pluralities of said second logic circuit means, each coupled for reacting to the outputs of a different pair of said detectors, said first and second pluralities being associated with the said detectors on opposite sides of the desired loop position;

one of said first logic circuit means and said first plurality of second logic circuit means being arranged for causing said driving means to introduce web material relative to said buffer device for causing the web material to approach the desired loop position from one direction, whereas the other of said first logic means and said second plurality of second logic circuit means being arranged for causing said driving means to remove web material relative to said buffer device for causing the web material to approach the desired loop position from the other direction; and which further includes means for responding to the presence of the web material loop between the detectors associated with a said logic circuit means for deactivating all other said logic circuit means.

7. Apparatus in accordance with claim 6, which further includes third logic means coupled to respond to the outputs of the said detectors located immediately adjacent to and on either side of the desired loop position for causing said driving means to brake the web material movement whenever said web material is located between the said adjacent detectors.

8. Apparatus in accordance with claim 7, wherein each of said first and second logic circuit means are coupled and arranged to be deactivated whenever said third logic means is providing an output to said driving means.

9. Apparatus for controlling the positioning and movement of a web material from a reel in a vacuum column comprising:

reel drive means;

at least four sensors arrayed along the path of the tape loop in the vacuum column so as to define zones therebetween including an uppermost zone, an upper upper intermediate zone, a central zone, a lower intermediate zone and a lowermost zone, in that order;

first and second latch circuits coupled to said sensors for being set whenever the tape loop enters the uppermost and lowermost zones, respectively, said first and second latch circuits being reset whenever the loop reaches the said sensor defining the end of the respective said upper and lower intermediate zone closest to said central zone;

first and second AND circuits coupled to be partly conditioned by the set output of said first and second latch circuits, respectively, the other conditioning input for said first AND circuit being provided by a signal from a said sensor indicative that the loop is below said uppermost zone while the other conditioning input for said second AND circuit being provided by a signal from a said sensor indicating that the tape loop is above said lowermost zone;

first and second logic circuit means coupled to provide an output signal in response to the absence of an output from said first and second AND circuits, respectively, and to the outputs of the said sensors closest to said central zone for said upper intermediate and said lower intermediate zone, respectively, when the said sensors indicate the loop is above and below the said central zone, respectively, the output signal of said first logic means providing an indication to said reel drive means for causing the web material to be introduced into said column, whereas the output of said second logic means being arranged for directing said reel drive means to remove web material from said column; and whereby said reel drive means will move the web material loop towards said central zone whenever it has entered a said intermediate zone from said central zone or whenever it has entered said uppermost or lowermost zone, but wherein said reel drive means will coast whenever the web material loop has entered a said intermediate zone from said uppermost or lowermost zone.

10. Apparatus in accordance with claim 9, which further includes at least two additional sensors arranged within said central zone for defining upper, middle and lower central zones:

a third AND circuit partly conditioned by the output of the upper said additional sensor whenever the web loop is above said upper additional sensor;

a fourth AND circuit partly conditioned by the output of the lower said additional sensor whenever the web is below said lower additional sensor;

a third latch circuit coupled to said sensors to be set when the web loop is above said middle central zone and to be reset when the web loop is below said middle central zone, the set output of said third latch circuit completing the conditioning of said fourth AND circuit while the reset output thereof completes the conditioning of said third AND circuit, the output of said third AND circuit providing an indication to said reel drive means for causing the web material to be introduced into said column, whereas the output of said fourth AND circuit being arranged for directing said reel drive means to remove web material from said column; and which further includes third logic circuit means coupled to the outputs of said two additional sensors for providing a signal to said reel drive means for causing braking of web material movement whenever the web loop is in said middle central zone, and whenever the web loop is being moved towards said middle central zone by other than said reel drive means.